United States Patent [19]

Tussing

[11] 4,336,027
[45] Jun. 22, 1982

[54] DYEING AND MARKING AGENT

[75] Inventor: Reinhold Tussing, Redwitz, Fed. Rep. of Germany

[73] Assignee: Siemens Aktiengesellschaft, Munich, Fed. Rep. of Germany

[21] Appl. No.: 213,954

[22] Filed: Dec. 8, 1980

[30] Foreign Application Priority Data

Dec. 27, 1979 [DE] Fed. Rep. of Germany ....... 2952414

[51] Int. Cl.³ ...................... C09B 67/00; C09D 11/16
[52] U.S. Cl. ........................................... 8/611; 8/436; 8/918; 8/919; 8/924; 106/22; 427/261
[58] Field of Search ...................... 8/611, 436; 106/22; 427/261

[56] References Cited

U.S. PATENT DOCUMENTS

| | | | |
|---|---|---|---|
| 4,165,399 | 8/1979 | Germonprez et al. | 106/22 |
| 4,166,044 | 8/1979 | Germonprez et al. | 106/22 |
| 4,261,748 | 4/1981 | Rosenstock et al. | 106/22 |

*Primary Examiner*—A. Lionel Clingman
*Attorney, Agent, or Firm*—Kenyon & Kenyon

[57] ABSTRACT

As an additive in dyeing and marking agents, 0.5 to 20% by weight of an alkali alcoholate, particularly the sodium or potassium salt of tertiary butanol, is used. The dyeing and marking agents have high contrast (PSC-value greater than 0.8) and have no corrosive action. The agents are particularly suitable as the recording liquid in printers and ink jet recorders.

5 Claims, No Drawings

DYEING AND MARKING AGENT

BACKGROUND OF THE INVENTION

The present invention relates to dyeing and marking agents containing a dye in solution in a liquid medium which consists either completely or predominantly of one or several organic solvents.

Dyeing agents, for example, black ink having a dye content of about 2.4% by weight (referred to the solution) are known, with which color contrasts having a PCS-value of about 0.6 can be obtained. Deepening the color by increasing the dye content often is not possible because of the limited solubility of the dye. The dye generally contains salts produced in the manufacture thereof and extenders such as sodium carbonate, sodium sulfate and sodium chloride. While the use of non-extended or pure dyes permits dye concentrations of about 5%, the solutions of such dyes in media with predominantly organic solvents have a very aggressive behavior vis-a-vis metals and, for example, attack pure nickel. With predominantly aqueous media, the drying times are excessively long.

It is further known that by adding solubilizers with alkaline action such as amines (for example, morpholine, isophoronediamine, pyridine) and alcohol amines, (for example, ethanol amines, dimethylamino ethanol) an increase in the concentration of the dye in the dye solution of up to 15% by weight can be obtained. Such additives, however, do not prevent corrosion. In addition, many of the added amines and alcohol amines have a very disagreeable odor which is absorbed by the material to be dyed and also evaporate from fibers only after a long period of time.

SUMMARY OF THE INVENTION

It is an object of the present invention to provide high-contrast dyeing and marking agents which wet well and dry fast without objectionable odors, while at the same time not attacking the metallic parts of the processing equipment.

This and other objects are achieved by the provision of dyeing and marking agents which, according to the present invention, contain from about 0.5 to 20% by weight, referred to the dye, of an alkali alcoholate. Additions of from about 0.5 to 20% by weight of the sodium or potassium salt of tertiary butanol have been found to be particularly effective. A dye concentration of more than 12% and complete freedom from corrosion is thereby achieved without annoying or unpleasant odors. The writing is clearly visible, has more contrast and is wipe-proof. The PCS-values are greater than 0.8. The dyeing agents according to the present invention do not attack metals in the processing plants, do not dry up in the processing equipment and are immediately wipe-proof on substrates such as cellulose (paper), leather and the like.

With the dyeing and marking agents according to the present invention, markings and information can be applied to almost any surface in the form of lines, marks, alpha-numeric symbols or pictures by means of any process, for example, with fiber recorders or also by the ink jet method, where either the record carrier or the recorder itself can be moved.

The record carriers may be paper, textile fabrics of cellulose or wool or also hydrophilic polymers such as polyamides, gelatine and the like.

Suitable dyes are substantive dyestuffs, for example azo dyes or dyes of the triphenyl methane type. Due to their molecular structure—the aromatic rings which can align themselves in one plane, hydroxyl and/or amino groups which form hydrogen bridges and a few water-solubility-promoting groups such as sulfone and/or carboxyl groups or the salts thereof—they are soluble in the preferably employed solvent mixtures consisting of alcohols, glycol ethers and glycols with dimethylsulfoxide. They attach themselves to fibers without fixation agents and are highly bleed-off-proof. In the dyeing and marking agents according to the present invention, 5 to 15% by weight of the dyes, referred to the solution, may be present.

As solvents are commonly used mixtures of two or more miscible solvents. Suitable solvents are, for example, diols such as butane diol; glycol ethers such as methyldiglycol; glycols such as diethylene glycol and alcoholates such as methoxy butanol. Such solvents preferably contain an addition of dimethyl sulfoxide. An addition of water may be advantageous with respect to increasing the solubility.

The dyeing and marking agents according to the present invention also may contain, if necessary, thickeners and filmforming agents.

The dyeing and marking agents according to the present invention have proven themselves particularly useful for the dyeing of and printing on fibers having hydroxyl and/or amine groups, for example, cellulose or leather. They are used to particular advantage in writing devices, for example, in ink mosaic printers and ink jet recorders.

DETAILED DESCRIPTION OF THE INVENTION

The present invention is described in further detail with reference to the following examples for suitable dyeing and marking agents.

For carrying out the visual corrosion test in these Examples, 15 ml each of the different marking liquids according to the invention are compared according to the following reference scale:
1 = unchanged, not visible
2 = point corrosion, slight, less than 10%
3 = point corrosion, heavy, greater than 10%
4 = area corrosion, slight greater than 10%
5 = area corrosion, heavy, greater than 10%
6 = colored, for instance, black tarnish For executing the examples, the following substances are respectively mixed in a vessel equipped with a mechanical stirrer at room temperature:

EXAMPLE 1

| | |
|---|---|
| As solvents: | 2 parts by weight diethylene glycol |
| | 1 part by weight dimethyl sulfoxide |
| As dye: | Substantive, black, 6% |
| As additive: | 5% by weight potassium tertiary butylate, referred to the dye |
| Loss $\mu$m at 70° C.: | 1st week = 0, 3rd week = 0 |
| Visual at 70° C.: | 1 |

EXAMPLE 2

| | |
|---|---|
| Solvent: | as in Example 1 |
| Dye: | Substantive, black, 12% |
| Additive: | Potassium tertiary butylate, 15% |

EXAMPLE 3

| | |
|---|---|
| Solvent: | as in Example 1 |
| Dye: | Substantive, black, 12% |
| Additive: | Sodium salt of diethylene glycol, 7% |
| Loss μm at 70° C.: | 1st week = 0, 3rd week = 0 |
| Visual at 70° C.: | 1 |

EXAMPLE 4

| | |
|---|---|
| Solvent: | 1 part by weight diethylene glycol |
| | 1 part by weight dimethyl sulfoxide |
| | 1 part by weight methyl diglycol |
| Dye: | Substantive, black, 6.3% |
| Additive: | Potassium tertiary butylate, 17% |
| Loss μm at 70° C.: | 1st week = 0, 3rd week = 0 |
| Visual at 70° C.: | 1 |

EXAMPLE 5

| | |
|---|---|
| Solvent: | 1 part by weight diethylene glycol |
| | 1 part by weight dimethyl sulfoxide |
| | 1 part by weight methoxy butanol |
| Dye: | Substantive, black, 10% |
| Additive: | Potassium tertiary butylate, 12% |
| Loss μm at 70° C.: | 1st week = 0, 3rd week = 0 |
| Visual at 70° C.: | 0 |

The substantially poorer values for the loss obtained with morpholine, triethanol amine and aniline in comparison thereto and the visual evaluation may be seen from the following Table:

| | Storage at 70° C. Loss | | |
|---|---|---|---|
| Additive* | 1 week | 3 week | Visual Evaluation |
| 7% Morpholine | 5 μm | 8 μm | 5/6 |
| 9% Morpholine | 5 | 20 | 5/6 |
| 12% Triethanol amine | 8 | 10 | 5/6 |
| 14% Triethanol amine | 5 | 12 | 5/6 |
| 16% Triethanol amine | 2 | 15 | 5/6 |
| 9% Aniline | 12 | | 5/6 |

*Additive referred to an approx. 6% dye solution.

What is claimed is:

1. A dyeing and marking agent comprising a solution of a dye in a liquid medium consisting either completely or predominantly of one or more organic solvents, and from about 0.5% to 20% by weight, referred to the dye, of an alkali alcoholate.

2. A dyeing and marking agent according to claim 1 containing from about 0.5% to 20% by weight, referred to the dye, of the sodium or potassium salt of an alcohol.

3. A dyeing and marking agent according to claim 1 containing from about 0.5 to 20% by weight, referred to the dye, of potassium tertiary butylate.

4. A process for writing, printing and inking on substrates selected from cellulose, polyamide, leather, and paper, comprising applying the dyeing and marking agent of claim 1 to said substrate by means of a writing, printing or inking device.

5. The method according to claim 4 wherein said inking device is a ink jet recorder.

* * * * *